United States Patent
Obrestad et al.

(10) Patent No.: US 6,176,892 B1
(45) Date of Patent: Jan. 23, 2001

(54) METHOD FOR MAKING NITROGEN-POTASSIUM FERTILIZER CONTAINING CALCIUM NITRATE AND PRODUCTS THEREOF

(75) Inventors: Torstein Obrestad, Ulefoss; Jan Birger Isaksen; Lars Gustav Moland, both of Porsgrunn, all of (NO)

(73) Assignee: Norsk Hydro ASA, Oslo (NO)

(*) Notice: Under 35 U.S.C. 154(b), the term of this patent shall be extended for 0 days.

(21) Appl. No.: 09/051,958

(22) PCT Filed: Oct. 18, 1996

(86) PCT No.: PCT/NO96/00244

§ 371 Date: Jul. 21, 1998

§ 102(e) Date: Jul. 21, 1998

(87) PCT Pub. No.: WO97/15536

PCT Pub. Date: May 1, 1997

(30) Foreign Application Priority Data

Oct. 27, 1995 (NO) ........................................ 954336

(51) Int. Cl.$^7$ .............................. C05C 13/00; C05C 5/00; C05C 5/02; C05C 5/04; C05C 7/02
(52) U.S. Cl. .................... 71/31; 71/54; 71/58; 71/59; 71/61; 71/64.01; 71/64.03; 71/64.13; 23/313 R; 23/313 P
(58) Field of Search .................... 71/31, 58, 64.03, 71/28, 59, 61, 64.13, 64.01, 54; 23/313 R, 313 P; 264/5, 13

(56) References Cited

U.S. PATENT DOCUMENTS

| | | | |
|---|---|---|---|
| 3,459,531 | * 8/1969 | Chapin et al. ...................... | 71/62 |
| 4,240,818 | * 12/1980 | Sokolov et al. ..................... | 71/59 |
| 4,394,149 | * 7/1983 | Szoka, Jr. et al. ................... | 71/28 |
| 4,954,134 | * 9/1990 | Harrison et al. .................... | 23/313 R |
| 5,743,934 | * 4/1998 | Wommack et al. .................. | 71/28 |

FOREIGN PATENT DOCUMENTS

| | | |
|---|---|---|
| 38363 | 12/1992 | (CL). |
| 861676 | 2/1941 | (FR). |
| 1279695 | 11/1961 | (FR). |
| 392531 | 5/1933 | (GB). |
| 7-5421 | 1/1995 | (JP). |

OTHER PUBLICATIONS

Derwent–Acc–No: 1967–05672H, Apr. 1969.*
Derwent–Acc–No: 1980–43442C, Mar. 1980.*
Weast, Robert C., *CRC Handbook of Chemistry and Physics, 54th ed.*, 1973–1974, pp. B–78 & B–125.*
The Ullmann's Encyclopedia of Industrial Chemistry, vol. A2, page 252 and vol. A10, pp. 374–387.

* cited by examiner

*Primary Examiner*—Steven P. Griffin
*Assistant Examiner*—Eileen E. Nave
(74) *Attorney, Agent, or Firm*—Wenderoth, Lind & Ponack, L.L.P.

(57) ABSTRACT

The invention relates to a method for making NK-fertilizers basically from calcium nitrate fertilizers and potassium nitrate and homogeneous NK-fertilizer products. Calcium nitrate fertilizer is melted together with potassium nitrate to form a melt or suspension thereof which is particulated to form a homogeneous NK-fertilizer. The calcium nitrate fertilizer and the potassium nitrate are melted at 90–120° C. and then heated to the desired particulation temperature being 160–190° C. for prilling and 90–140° C. for granulation. The components are mixed in ratios giving a melt or suspension comprising 40–14 weight % calcium nitrate, 55–85 weight % potassium nitrate, 0.5–6 weight % water, 0–4 weight % ammonium nitrate and 0–5 weight % magnesium nitrate.

8 Claims, 1 Drawing Sheet

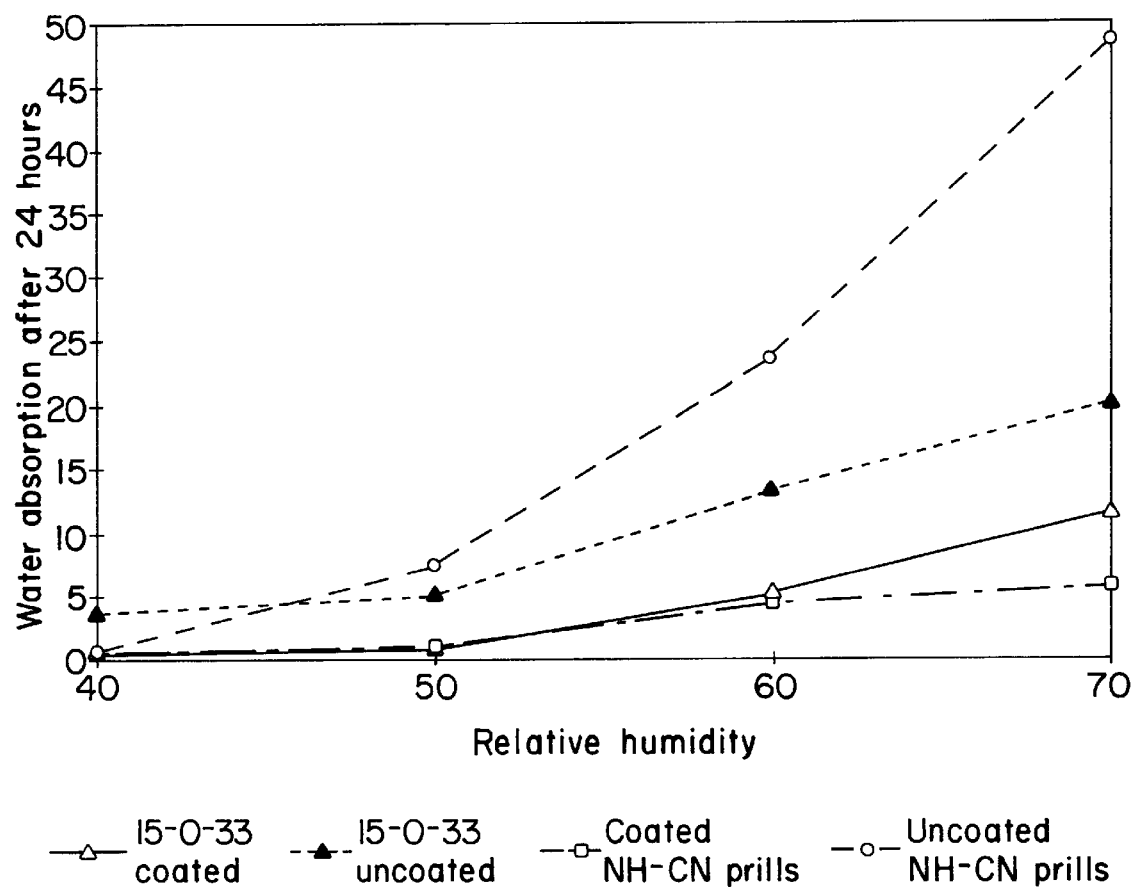

METHOD FOR MAKING NITROGEN-POTASSIUM FERTILIZER CONTAINING CALCIUM NITRATE AND PRODUCTS THEREOF

This application is a 371 application of International application No. PCT/NO96/00244, filed Oct. 18, 1996.

The present invention relates to a method for preparation of nitrate and potassium containing fertilizers (NK-fertilizers) in particulated form. The invention further comprises products of such NK-fertilizers.

NK-fertilizers can be made by blending N-fertilizers with K-fertilizers, but there has been a need for having at least some homogeneous formulations of NK-fertilizers. The N-source can be urea or a nitrate fertilizer such as ammonium nitrate or calcium nitrate (CN) and the potassium source can be a K-fertilizer like $KNO_3$ (KN), KCI, or $K_2SO_4$. However, particulation, both with regard to prilling and granulation, has proved to cause great problems. Thus it has been experienced that when CN and $KNO_3$ have been melted together, substantial undercooling caused severe problems for the particulation step. A NK-fertilizer based on CN and $KNO_3$ was considered to be most interesting as it could be expected to possess all the advantages of a CN-fertilizer and in addition contain water-soluble potassium from a nitrate source.

From Japanese application JP 95005421 B2 it is known a granular NK-fertilizer made from an eutectic material consisting of 90–50 weight % urea and 10–50 weight % potash (potassium carbonate). The granular product is made by spraying through a small hole the eutectic solution on raw material which is fed into a kneader and then mixed and melted. For equalizing the elution speed of the nitrogen and the potash, the granules are covered with a coating material having polypropylene resin as a major component. This is a most complicated process. Such a fertilizer will have a large part of its nitrogen as $NH_4$—N and corresponding loss of this nitrogen. The reason for this is of course that urea constitutes the only N-source of the fertilizer. Further, there will be no water-soluble calcium as will be the case when CN and $KNO_3$ are the N-sources.

Addition of a potassium source to a nitrogen-potassium fertilizer is known from U.S. Pat. No. 3,617,235 which comprises spraying melts or suspensions with a low water content and containing the plant nutrients nitrogen and phosphorous. Solid potassium salt is added before spraying or prilling said melt or suspension. However, this process requires that solids added are graded so that more than 7 weight % has a grain size exceeding 0.1 mm. Though this process functions excellently for NPK-fertilizer, this principle has not been found to be useful for particulating NK-fertilizers, mainly due to the undercooling problems and that the required particle size for the solids is not available in the market.

The main object of the invention was to arrive at a new method for particulating NK-melts or solutions into homogeneous NK-fertilizers.

Another object was to arrive at a method for making NK-fertilizers based on calcium nitrate fertilizers and potassium nitrate.

A further object was to develop a method for making NK-fertilizers which in addition also contained other nutrients like magnesium nitrate.

It was also an object to arrive at homogeneous NK-fertilizers which could be applied alone or as blending components either for special NK-formulations or NPK-fertilizer blends.

Due to the disadvantages related to known NK-fertilizers, it was decided to investigate further the possibilities of applying CN and $KNO_3$ as basic raw materials for the new fertilizer. Throughout this description the abbreviation CN is meant to cover both pure calcium nitrate and the calcium nitrate product obtained from a nitrophosphate process. This product is often called Norsk Hydro Calcium Nitrate abbreviated NH-CN and has the following composition: 79 weight % calcium nitrate, 6 weight % ammonium nitrate and 15 weight % water. Several ways of making the desired NK-fertilizer formulations were evaluated. Thus compactation of prilled CN and crystalline $KNO_3$ and blending of available prilled CN and prilled $KNO_3$ were tested. Compactation was found to be expensive and gave a product with rather high dust content. Blending is first of all dependent on having similar particles with regard to particle size and particle size distribution for the two raw materials in question. Secondly, a homogeneous product will not be obtained.

Though undercooling was considered to be a problem, the inventors decided to investigate further making homogeneous NK-fertilizer from melts of at least one of the components and possibly add the other component as solids to the melt. Solid $KNO_3$ was dissolved in melted CN, but initial tests showed that then the undercooling was so severe that prilling/granulation would be impossible. Series of experiments were conducted adding solid $KNO_3$, having various particle size, to melted CN at about 100° C. The particle size of the solids was varied between 0.2–1.6 mm. The question was whether the mixture could solidify before the $KNO_3$ particles dissolved in the CN melt and thereby resulted in undercooling of the melt. During these experiments the ratios between CN and $KNO_3$ were also varied. The following two formulations were especially tested: 70 weight % CN and 30 weight % $KNO_3$, corresponding to the NPK-formulation (defined as N—$P_2O_5$—$K_2O$) 15-0-14, and 85 weight % CN and 15 weight % $KNO_3$, corresponding to the formulation 15-0-7. However, during all these experiments some undercooling was experienced. If the particle size of the solids <0.3 mm, the undercooling was substantial. To avoid undercooling the particle size of the solids should be larger than 1 mm. But $KNO_3$ having this particle size is not available on the market and in addition such large particles would cause problems during prilling. Though it might be possible to obtain particulated homogeneous NK-fertilizers with this method, it was not considered to be the ultimate solution to the problem and further investigations of this method were terminated.

Then it was decided to perform a thorough investigation of the various phases for CN-water-$KNO_3$. During these investigations it was surprisingly found that there was indeed an area where undercooling would not cause substantial problems. Accordingly, it should be possible to perform particulation by applying traditional methods and equipment. This area can be defined as follows:

| | |
|---|---|
| $Ca(NO_3)_2$ | 40–14 weight % |
| $KNO_3$ | 55–85 weight % |
| Water | 0.5–6 weight % |

It was further found that to such NK-melts/solutions $MgNO_3$ , could be added in amounts of 0–5 weight %. The fertilizer mixture to be particulated could also contain 0–4 weight % ammonium nitrate (AN).

In view of these findings particulation of melts/solutions within the above ranges was performed. Successful prilling could be carried out at temperatures of 160–190° C. and granulation could be conducted at temperatures of 90–140° C. Thus it was obtained homogeneous NK-fertilizer products having particle size of 1–5 mm and within desired size distribution. The products were of nice spherical shape and the particles had a hardness or crushing strength of about 2–13 kg, depending on water content and size.

The present invention thus provides a method for making NK-fertilizers which comprises melting calcium nitrate fertilizer and potassium nitrate at 90–120° C. to form a melt or suspension thereof, heating the melt or suspension to a temperature suitable for particulation, and particulating the heated melt or suspension to form a homogeneous NK-fertilizer.

Preferably the components are mixed in ratios giving a melt or suspension comprising 40–14 weight % calcium nitrate, 55–85 weight % potassium nitrate, 0.5–6 weight % water, 0–4 weight % ammonium nitrate and 0–5 weight % magnesium nitrate.

The particulation can be performed by prilling at temperatures of 160–190° C., or by granulation of a melt or suspension containing 10–2.5 weight % water at a granulation temperature of 90–140° C., For example, about 60 weight % potassium nitrate and about 40 weight % of a calcium nitrate fertilizer are melted at about 100° C. forming a melt containing about 60 weight % $KNO_3$, about 31.5 weight % $Ca(NO_3)_2$, about 2.5 weight % $NH_4NO_3$ and about 6 weight % water, and this melt is evaporated till the water content is reduced to about 3 weight % and then subjected to prilling at 160–170° C.

Another example is where about 30 weight % granulated calcium nitrate fertilizer and about 70 weight % crystalline potassium nitrate are melted at about 100° C. and the thereby formed melt then is evaporated till its water content is reduced from 4.5 weight % to 2.5 weight % subsequent to prilling at 165–175° C., Fine grain particles from a NK 15-0-33 fertilizer can be supplied to a granulator together with a liquid of the same fertilizer and granulated at 120–125° C.

The present invention also provides homogeneous NK-fertilizer comprising 40–14 weight % $Ca(NO_3)_2$, 55–85 weight % $KNO_3$, 0.5–6 weight % water, 0–4 weight % $NH_4NO_3$ and 0–5 weight % $Mg(NO_3)_2$.

Preferably, the fertilizer is a prilled product with a NK-formulations 15-0-35 to 15-0-28 having a crushing strength of 2–9 kg.

The invention will now be further explained in connection with the description of the figures and examples.

The FIGURE shows water absorption of NK-fertilizers according to the invention compared with corresponding results for NH-CN.

EXAMPLE 1

This example shows prilling of NK 15-0-35.

75 weight % solid KN was mixed with 25 weight % NH-CN and heated to about 100° C., at which temperature melting of the mixture started. Water content and viscosity were adjusted to desired values, whereupon the homogeneous melt was transferred to a prilling device and prilling was performed at about 165° C. into an oil bath. Nice, white and hard particles were obtained. The particle strength of 3–4 mm particles was found to be in the range 8–13 kg.

EXAMPLE 2

This example shows prilling of NK 15-0-33.

70 weight % crystalline KN was mixed with 30 weight % NH-CN and melted at about 100° C., and subsequently the water content and viscosity were adjusted to desired values and the homogeneous melt was prilled at about 165° C. The product qualities of the prilled particles were similar to that obtained in Example 1.

EXAMPLE 3

This example shows prilling of NK 15-0-29.

60 weight % KN and 40 weight % NH-CN were mixed and melted at about 100° C. and this melt had then the following composition:

60 weight % KN, 31.5 weight % CN, 2.5 weight % AN and 6 weight % water.

The water content was then reduced to about 3 weight % and the temperature increased to about 165° C., whereupon the homogeneous melt was subjected to prilling.

The particle strength of fresh product (3–4 mm) was measured to 5 kg and for particles aged for 30 minutes to 9 kg.

EXAMPLE 4

This examples shows full-scale prilling of NK 15-0-33.

During these experiments melts made from 30 weight % granulated NH-CN and 70 weight % crystalline KN were used. In order to increase the particle strength of the finished product the water content of the melt was reduced from 4.5 weight % to 2.5 weight % by evaporation. Prilling was performed in a prilling tower of 23 m and at outdoor temperatures of 28° C. The prilling temperature during these experiments was varied between 160–190° C.

It was found that products with sufficient solidifying properties could be obtained for this NK-formulation even when the water content prior to prilling was as high as 4.5 weight %.

EXAMPLE 5

This example shows granulation of NK 15-0-33.

The granulation was performed by supplying fine dust of NK 15-0-33 fertilizer to a granulation to which melt of the same product was supplied. The granulation temperature was varied between 115–125° C., and it was found that granular products having desired size and crushing strength could be obtained. The most preferred granulation temperature was found to be in the range 120–125° C. Further tests showed that granulation of NK-fertilizers could be performed at 90–140° C., depending on the NK-formulations to be produced and the water content of the melt.

EXAMPLE 6

This example relates to making NK 15-0-14 by blending homogeneous NK-fertilizers according to the invention with other fertilizers like NH-CN.

42 weight % homogeneous NK 15-0-33 made according to the above Example 4 and having a density of 1.97–1.98 kg/liter and average diameter d50=1.78 mm was mixed mechanically with 58 weight % NH-CN having a density of 1.96.–1.98 kg/liter and d50 1.78 mm. These two types of products had about equal shape and particle size distribution. The resulting blend had the formulation 15-0-14 and had a uniform appearance and the particles did not segregate.

By applying the above procedure it will be possible to make all grades from NK 15-0-33 down to NK 15-0-0. The fertilizer component which is added to the homogeneous NK-fertilizer according to the invention, does not have to be CN or NH-CN, but can be any suitable fertilizer for arriving at the desired NK-fertilizer formulation of the blend. The same requirements with regard to particle size, distribution, particle shape and density will of course also apply for such blends.

The new homogeneous NK-fertilizer products were further tested with regard to caking properties and water absorption. These properties were compared with the same for prilled NH-CN. The coating used during the test was a coating based on oil, wax and resin, described in the International Patent Application PCT/NO95/00109. The results are shown in Table I.

TABLE I

| NK 15–0–33 (2.5% water, prilled) | | NH-CN (prilled) | |
|---|---|---|---|
| 0.2% coating Caking No.: 340 | Uncoated Caking No.: 1050 | 0.2% coating Caking No.: 590 | Uncoated Caking No. 1080 |

From the above Table I it can be seen that conditioned NK-fertilizer will have somewhat better caking properties than prilled NH-CN.

Water absorption for homogeneous NK-15-0-33 according to the invention was investigated for both coated and uncoated particles. The results were compared for those of prilled NH-CN. The tests were performed at 25° C. and 40, 50, 60 and 70% relative humidity (RH), respectively. The results of these tests are shown in the graphs of the FIGURE. From these it can be seen that uncoated NK 15-0-33 should not be exposed to high humidities for an extended time. However, if this fertilizer is coated by about 0.2 weight % of a suitable coating the water absorption will be acceptably low.

A new method of making homogeneous NK-fertilizers has been achieved by the present invention. The new NK-products can be applied as such or blended with other suitable fertilizers to make fertilizer blends with the desired formulations. The new homogeneous NK-products have excellent properties both with regard to nutrient value and storage and handling properties.

What is claimed is:

1. A method for making an NK-fertilizer basically from a calcium nitrate fertilizer and potassium nitrate, and where the calcium nitrate fertilizer is melted together with potassium nitrate, which method comprises melting the calcium nitrate fertilizer and potassium nitrate to form a melt or suspension thereof comprising 40–14 weight % calcium nitrate, 55–85 weight % potassium nitrate, 0.5–6 weight % water, 0–4 weight % ammonium nitrate and 0–5 weight % magnesium nitrate, heating the melt or suspension to a temperature suitable for particulation, and particulating the melt or suspension to form a homogeneous NK-fertilizer.

2. A method according to claim 1, wherein the particulation is performed by prilling at temperatures of 160–190° C.

3. A method according to claim 1, wherein the particulation is performed by granulation of the melt or suspension containing 1.0–2.5 weight % water at a granulation temperature of 90–140° C.

4. A method according to claim 1, wherein about 60 weight % potassium nitrate and about 40 weight % of a calcium nitrate fertilizer are melted at about 100° C. forming a melt containing about 60 weight % $KNO_3$, about 31.5 weight % $Ca(NO_3)_2$, about 2.5 weight % $NH_4 NO_3$ and about 6 weight % water, and the melt is evaporated until the water content is reduced to about 3 weight % and then subjected to prilling at 160–170° C.

5. A method according to claim 1, wherein about 30 weight % granulated calcium nitrate fertilizer and about 70 weight % crystalline potassium nitrate are melted at about 100° C. to form a melt and the melt then is evaporated until its water content is reduced from 4.5 weight % to 2.5 weight % subsequent to prilling at 165–175° C.

6. A method according to claim 1, wherein fine grain particles from a NK 15-0-33 fertilizer are supplied to a granulator together with a liquid NK 15-0-33 fertilizer and granulated at 120–125° C.

7. A homogeneous NK-fertilizer, based on a calcium nitrate fertilizer and potassium nitrate, wherein the NK-fertilizer comprises 40–14 weight % $Ca(NO_3)_2$, 55–85 weight % $KNO_3$, 0.5–6 weight % water, 0–4 weight % $NH_4 NO_3$ and 0–5 weight % $Mg(NO_3)_2$.

8. The homogeneous NK-fertilizer according to claim 7, wherein the NK-fertilizer is a prilled product with an NK-formulation 15-0-35 to 15-0-29 having a crushing strength of 2–9 kg.

* * * * *